United States Patent [19]

Schauer

[11] Patent Number: 5,418,893
[45] Date of Patent: May 23, 1995

[54] METHOD OF DIGITALLY PROCESSING IMAGES

[75] Inventor: Ulrich Schauer, Sinsheim, Germany

[73] Assignee: International Business Machines Corp., Armonk, N.Y.

[21] Appl. No.: 207,820

[22] Filed: Mar. 8, 1994

Related U.S. Application Data

[63] Continuation of Ser. No. 669,257, Mar. 14, 1991, abandoned.

[30] Foreign Application Priority Data

Mar. 17, 1990 [DE] Germany .................. 90105071 U

[51] Int. Cl.⁶ .............................................. G06F 15/62
[52] U.S. Cl. ..................................... 395/118; 395/133
[58] Field of Search .......................... 35/118, 119, 133

[56] References Cited

U.S. PATENT DOCUMENTS 4,884,232 11/1989 Schlunt ............................ 364/754

*Primary Examiner*—Mark R. Powell
*Assistant Examiner*—Huynh Ba
*Attorney, Agent, or Firm*—Eugene I. Shkurko

[57] ABSTRACT

When processing an image it is often necessary to combine parts of its matrix mathematically, e.g. to multiply a part of this matrix with a given weighting function. In this context scalar products of vectors are important operations. The invention provides a coding procedure wherein two of the elements of two vectors are transformed to one encoded element, respectively, and are then stored. This has the result that the calculation of the scalar product requires two encoding operations of the elements and one multiplication of the encoded elements. When calculating another scalar product with at least partly the same elements the encoding operations of a number of elements are already done and the stored encoded elements can be used. This has the consequence that the calculation of this other scalar product requires at least partly no encoding operations but only multiplications of the stored encoded elements.

14 Claims, No Drawings

METHOD OF DIGITALLY PROCESSING IMAGES

The application is a continuation, of application Ser. No. 07/669,257, filed Mar. 14, 1991 now abandoned.

BACKGROUND OF THE INVENTION

The invention relates to a method of digitally processing images in the form of digital data which can be part of scalar products of vectors with a number of elements, respectively. Especially, the invention relates to methods for the calculation of scalar products in connection with e.g. weighted averaging, filtering or convolution in image processing.

A digital image consists of a matrix of e.g. 256×256 pixels, each pixel having e.g. 256 graytones. When processing this image it is often necessary to combine parts of this matrix mathematically, e.g. to multiply a part of this matrix with a given weighting function. In this context scalar products of vectors with a number of elements are important operations.

When digitally processing images for creating a three-dimensional representation of computer tomography pictures these mathematical operations have to be calculated very often. For that reason, for a real-time visualization of said computer tomography pictures the calculation of said scalar products should be as fast as possible.

The object of the invention is to accelerate the calculation of scalar products in image processing.

Normally the calculation of a scalar product of two vectors with two elements, respectively, requires two multiplications and one addition.

SUMMARY OF THE INVENTION

The present invention provides a coding procedure wherein two of the elements of said two vectors are transformed to one encoded element, respectively, and are then stored. This has the result that the calculation of said scalar product requires two coding operations of the elements and one multiplication of the encoded elements. In this case, the coding procedure has almost no time-saving effect.

But when calculating another scalar product with at least partly the same elements the encoding operations of a number of elements are already done and the stored encoded elements can be used. This has the consequence that the calculation of this other scalar product requires at least partly no encoding operations but only multiplications of the stored encoded elements. It is apparent that in this case the calculation of the scalar product can be more than twice as fast as the known normal calculation.

When calculating a scalar product of two vectors with a huge number of elements the described calculation can be done piecewise by splitting the vectors into associated segments. The obtained partial scalar products of said segments can then be added up to form the final scalar product. In this context, too, the same acceleration as mentioned above can be achieved by using the stored encoded elements of a previous calculation.

Further objects and advantages of the invention will become apparent from the following description of embodiments of the invention.

DETAILED DESCRIPTION OF THE PREFERRED EMBODIMENT

In image processing a digital image often consists of a matrix with a number of elements. Each element represents a pixel of said image, with each pixel having a value which represents the color or the graytone of said pixel. For a three-dimensional representation of computer tomography pictures or for other processes, e.g. halftoning, it is often necessary to combine said pixel matrix or parts of it with a weighting function or weighting matrix. This mathematical operation includes the calculation of scalar products of vectors.

The scalar product (SP) of two vectors
a=(a1, a2, a3, . . . , an) and
b=(b1, b2, b3, . . . , bn) is defined as $$SP = a1 \cdot b1 + a2 \cdot b2 + a3 \cdot b3 + a4 \cdot b4 + a5 \cdot b5 + \ldots + an \cdot bn \quad (1).$$

According to the invention, said scalar product (SP) is calculated in a different manner as follows.

Two of the elements (a1, a2; b1, b2; a3, a4; b3, b4; . . . ) of said two vectors are encoded alternatively, thereby creating encoded elements (u1,u2, u3, u4 . . . ), respectively. If n is odd then the last elements of said vectors are used directly as the respective encoded elements.

For encoding the following equations are used:

$$u1 = a1 + a2 \cdot 2^k \quad (2),$$

$$u2 = b1 + b2 \cdot 2^{-k} \quad (3),$$

$$u3 = a3 + a4 \cdot 2^k \quad (4),$$

$$u4 = b3 + b4 \cdot 2^{-k} \quad (5),$$

etc.

These encoded elements (u1u,2, . . . ) are stored.

Partial products (p2, p4, . . . ) are created by multiplying two alternating encoded elements (u1, u2; u3, u4; . . . ),respectively, according to the following equations:

$$p2 = u1 \cdot u2 \quad (6),$$

$$p4 = u3 \cdot u4 \quad (7),$$

etc.

Then a sum (s) is formed by adding up all partial products (p2, p4, . . . ):

$$s = p2 + p4 + \ldots \quad (8).$$

Finally the scalar product (SP) is created by decoding said sum (s). This decoding operation comprises a combining step of said sum (s) with a given mask for extracting out said scalar product (SP).

According to the invention for decoding said scalar product (SP) the following known mathematical identities are used:

$$(a1 + a2 \cdot 2^k) \cdot (b1 + b2 \cdot 2^{-k}) = a2 \cdot b1 \cdot 2^k + (a1 \cdot b1 + a2 \cdot b2) + a1 \cdot b2 \cdot 2^{-k} \quad (9),$$

$$(a3 + a4 \cdot 2^k) \cdot (b3 + b4 \cdot 2^{-k}) = a4 \cdot b3 \cdot 2^k + (a3 \cdot b3 + a4 \cdot b4) + a3 \cdot b4 \cdot 2^{-k} \quad (10),$$

etc.

It is apparent that the left sides of equations (9) and (10) correspond to equations (2) to (5). This has the consequence that the multiplication of two encoded elements (u1, u2; u3, u4; ... ), respectively, results in partial products (p2, p4, ...) according to the following equations:

$$p2 = a2 \cdot b1 \cdot 2^k + (a1 \cdot b1 + a2 \cdot b2) + a1 \cdot b2 \cdot 2^{-k} \quad (11),$$

$$p4 = a4 \cdot b3 \cdot 2^k + (a3 \cdot b3 + a4 \cdot b4) + a3 \cdot b4 \cdot 2^{-k} \quad (12),$$

etc.

Then, according to equation (8) the sum (s) is as follows:

$$s = (a2 \cdot b1 + a4 \cdot b3 + \ldots) \cdot 2^k + (a1 \cdot b1 + a2 \cdot b2 + a3 \cdot b3 + a4 \cdot b4 + \ldots) + (a1 \cdot b2 + a3 \cdot b4 + \ldots) \cdot 2^{-k} \quad (13).$$

The middle term in brackets of the right side of equation (13) corresponds to the right side of equation (1). But as the right side of equation (13) comprises two terms more, one term on the left side and one term on the right side of said middle term in brackets, the addition of the partial products (p2, p4, ...) according to equation (8) does not result in the scalar product (SP). A correction is necessary.

According to the invention this problem is overcome by selecting the value of the exponent (k) in such a way that the value of $2^k$ becomes greater than the greatest possible value of said scalar product (SP).

Said exponent (k) can be selected depending on the available number of bits for said scalar product. If there are e.g. 8 bits needed for the scalar product the exponent (k) is selected to be 8. This has the consequence that the value of $2^8$ is in any case greater than the greatest possible value of any of the three terms in brackets on the right side of equation (13).

If the necessary precision for the scalar product (SP) exceeds the available number of bits, the vectors are split into associated segments. This will be described later.

As all three bracketed terms of the right side of equation (13) are less than $2^k$ the middle term of said right side of equation (13) can be extracted with the help of a mask which removes all bits with a contribution greater than or equal to $2^k$ and which further removes all bits with a contribution less than 1. By removing out all bits with a contribution greater than or equal to $2^k$, the left term of equation (13) is eliminated, by removing all bits with a contribution less than 1, the right term of equation (13) i.e. the fractional part is eliminated.

As a summary, when adding the partial products (p2, p4, ...) according to equation (8) the left and the right term of equation (13) do not influence the middle term of said equation (13). These left and right terms can be eliminated from the sum (s) of said partial products (p2, p4, ...) in said decoding step as described above. What remains is the middle term of equation (13). A comparison with equation (1) shows that said middle term is exactly the scalar product (SP).

For non-negative values of the elements of said vectors the above method can be used as described. It can be used also for non-positive elements of said vectors.

For mixed positive and negative integer values of the elements (a1, a2, ..., b1, b2, ...) a first possibility is to exploit a shift operation.

The following mathematical identity is used:

$$(\alpha + a1) \cdot (\beta + b1) + (\alpha + a2) \cdot (\beta + b2) + \ldots + (\alpha + an) \cdot (\beta + bn) = (a1 \cdot b1 + a2 \cdot b2 + \ldots + an \cdot bn) + \alpha \cdot \Sigma(b) + \beta \cdot \Sigma(a) + n \cdot \alpha \cdot \beta \quad (14)$$

with the values of $\alpha$ and $\beta$ being greater than or equal to the greatest magnitude of a negative element, n being the number of elements of said vectors, respectively, $$\Sigma(a) = a1 + a2 + \ldots + an \text{ and}$$

$$\Sigma(b) = b1 + b2 + \ldots + bn.$$

According to the invention the encoding step for positive and negative integer values of the elements is as follows:

$$u1 = (a1 + a2 \cdot 2^k) + \alpha \cdot (1 + 2^k) \quad (15)$$

$$u2 = (b1 + b2 \cdot 2^{-k}) + \beta \cdot (1 + 2^{-k}) \quad (16)$$

etc.

The values of . and b can be selected as powers of 2. If, for example, the elements (a1, a2, ..., b1, b2, ...) are given with sign and 9 bit precision the value range of the elements is from $-512 \ldots 511$ (decimal). In this case . and b are chosen as $2^m$ and the value of the exponent (m) is selected to be 9 with the consequence that the value of $2^9$ is half of the value range of the elements, i.e. 512 (decimal). This has the effect that the value range of the elements is shifted to $0 \ldots 1023$ (decimal).

The selection of the value of the exponent (k) has to consider the value range of the non-negative shifted elements, i.e. $0 \ldots 1023$ (decimal).

The multiplication of the encoded elements and the addition of the partial products is the same as described.

When decoding the sum (s) a correcting step has to be added as follows. Removing the left and the right term of the right side of equation (13) results in the scalar product of said non-negative shifted elements as defined by the left side of equation (14). To obtain the scalar product of the mixed positive and negative non-shifted elements the term $$\alpha \cdot \Sigma(b) + \beta \cdot \Sigma a + n \cdot \alpha \cdot \beta \quad (17)$$

has to be subtracted from said scalar product of the non-negative shifted elements. This follows directly from equation (14).

A second possibility for positive and negative integer values of the elements is as follows.

The encoding operation is the same as described for non-negative integer values of the elements except that binary digits for sign bits have to be provided for each of the three terms in brackets on the right side of equation (13). Actually this means that the value of the exponent (k) has to be increased by one. The multiplications and the additions are done with said signed values of the elements.

The decoding operation is carried out with the following steps:

The sign bit of the sum (s) is extracted and suppressed.

The sign bit of the right term of the right side of equation (13) is added in the middle term. This represents a rounding operation.

The left and the right term of the right side of equation (13) are eliminated as described, e.g. with the help of a mask.

If the sign bit of the extracted middle term of the right side of equation (13) is on, $2^k$ has to be subtracted from said middle term giving a negative result.

The sign bit of the final result is set minus if said extracted sign bit of the sum (s) is not equal to the sign bit of the extracted and decremented middle term.

In both cases, either for non-negative or non-positive values of the elements as well as for mixed positive and negative values of the elements, the described method can be carried out on a floating-point arithmetic unit of a computer, especially on a vectorized floating-point arithmetic unit. This has the advantage that the multiplications of the encoded elements can be calculated in a pipeline. Furthermore, the elimination of said left and said right term in said decoding step can be carried out by additions of so-called unnormalized floating-point zeroes.

When the described method is used for the calculation of only one scalar product it has almost no time saving effect as the encoded elements are used only once. But if the described method is used for the calculation of a number of scalar products, especially in connection with the combination of two or more matrices, e.g. matrix multiplication, the same encoded elements are used two or more times for the calculation of the partial products. In this case, a renewed calculation of said encoded elements is not necessary as these encoded elements are stored. This has the effect, that the time for encoding is saved. As a consequence, the time saving effect of the invention appears when said stored encoded elements can be used repeatedly and therefore the encoding operation is unnecessary.

It is possible that the calculation of a scalar product of two vectors with a huge number of elements needs more digits than available. In this case, the vectors are split into associated segments and the described method is carried out on these segments. The resultant partial scalar products are then added up to the final scalar product. The time saving effect of the invention can be achieved in the same manner as described above by using stored encoded elements of previous calculations.

For a better understanding the following examples are given.

1.) Binary scalar product with four non-negative elements:

Vectors: a=(101, 011), b=(111, 010)
Encoded elements: $u1=101+011 \cdot 2^k$, $u2=111+010 \cdot 2^{-k}$ The greatest possible scalar product is $111 \cdot 111+111 \cdot 111=1100010$; said greatest possible scalar product has seven bits with the consequence that the exponent (k) is selected to be k=7.

Encoded elements: $u1 = 101 + 011 \cdot 2^7 = 110000101$
$u2 = 111 + 010 \cdot 2^{-7} = 111.000001$
Partial product: $p2 = 110000101 \cdot 111.000001$
$= 101010101001.000101$ As there is only one partial product (p2) the sum (s) is identical with said partial product (p2).

As the exponent (k) is selected to be k=7, the eighth bit and all higher significant bits are eliminated. Furthermore, all bits of the fractional part, i.e. on the right side of the decimal point, are deleted, too. This decoding step could be done e.g. with an ANDing as follows:

```
        101010101001.000101
AND     000001111111.000000
        0101001
```

The result is the scalar product (SP) as follows:

SP=101001

The calculation of the same scalar product (SP) in a known manner has the following identical result:

$SP=101 \cdot 111+011 \cdot 010=100011+000110=101001$

In this example the time saving effect of the invention does not appear as the encoded elements are used only once.

2.) Two decimal matrices incorporating four scalar products with non-negative elements:

The calculation of the matrices in a known manner has the following result:

$$\begin{pmatrix} 5 & 4 & 3 & 2 \\ 2 & 3 & 4 & 5 \end{pmatrix} \cdot \begin{pmatrix} 5 & 1 \\ 3 & 2 \\ 4 & 1 \\ 2 & 0 \end{pmatrix} = \begin{pmatrix} 53 & 16 \\ 45 & 12 \end{pmatrix}$$

The calculation according to the described method provides two matrices of encoded elements:

$$\begin{pmatrix} 40005 & 20003 \\ 30002 & 50004 \end{pmatrix} \begin{pmatrix} 5.0003 & 1.0002 \\ 4.0002 & 1.0000 \end{pmatrix}$$

with $40005=5+4 \cdot 10^4$ etc. and $5.0003=5+3 \cdot 10^{-4}$ etc.

In this example the above described method has been adjusted to an eight digit decimal arithmetic without rounding.

The multiplication of these two matrices of encoded elements and the successive addition exploiting the described method has the following resultant matrix of sums:

$$\begin{pmatrix} 280053.00 & 60016.001 \\ 350045.00 & 80012.000 \end{pmatrix}$$

These four sums have to be decoded as described with the following result:

$$\begin{pmatrix} 53 & 16 \\ 45 & 12 \end{pmatrix}$$

This matrix is identical with the above matrix which was calculated in a known manner.

In this example the time saving effect of the invention is apparent as the encoded elements are used twice.

3.) Binary scalar product with four positive or negative integer values (first possibility):

Vectors a=(−011, −111), b=(101, −010)

Encoded elements: $u1 = (a1 + a2 \cdot 2^k) + 2^m \cdot (1 + 2^k)$ $u2 = (b1 + b2 \cdot 2^{-k}) + 2^m \cdot (1 + 2^{-k})$ The value range of the elements (a1, a2, b1, b2) is from −8 to 7 (decimal). This has the consequence, that it is sufficient to select the value of $2^m$ to be $2^3=8$ (decimal). So the value range of the non-negative shifted elements is from 0 to 15 (decimal).

For said shifted elements the greatest possible scalar product is 1111·1111+1111·1111=111000010; said greatest possible scalar product has nine bits with the consequence that the exponent (k) is selected to k=9.

Encoded elements: $u1 = (-011 - 111 \cdot 2^9) + 2^3 \cdot (1 + 2^9)$
= 1000000101

$u2 = (101 - 010 \cdot 2^{-9}) + 2^3 \cdot (1 + 2^{-9})$
= 1101.00000011

Partial product: $p2$ = 11000000101 · 1101.00000011
= 1101001000111.00001111

As there is only one partial product (p2) the sum (s) is identical with said partial product (p2).

As the exponent (k) is selected to be k=9 the tenth bit and all higher significant bits are eliminated.

Furthermore, all bits on the right side of the decimal point are removed, too. This decoding step could be performed e.g. with an ANDing as follows:

```
         1101001000111.00001111
AND      0000111111111.00000000
         0101001
```

Correcting step: $1000111 - 2^m \cdot (2^m \cdot n + \Sigma(a) + \Sigma b))$
= $1000111 - 2^3 \cdot (2^3 \cdot 2 + (-011 - 111) + (101 - 010))$
= $1000111 - 8 \cdot (8 \cdot 2 + (-3 - 7) + (5 - 2))$
= $1000111 - 1001000 = -1$ The result is the scalar product (SP) as follows:

SP = −1

The calculation of the same scalar product (SP) in a known manner has the following identical result:

SP = −011·101 + 111·010 = −001111 + 001110 = −1

In this example the time saving effect of the invention does not appear as the encoded elements are used only once.

4.) Two decimal matrices incorporating four scalar products with mixed positive and negative integer elements (first possibility):

The calculation of the matrices in a known manner has the following result:

$$\begin{pmatrix} -5 & 4 & 3 & -2 \\ 2 & 3 & -4 & -5 \end{pmatrix} \begin{pmatrix} -5 & 1 \\ -3 & -2 \\ 4 & -1 \\ 2 & 0 \end{pmatrix} = \begin{pmatrix} 21 & -16 \\ -45 & 0 \end{pmatrix}$$

The calculation according to the first possibility described provides two matrices of encoded elements:

$$\begin{pmatrix} 14005 & 80013 \\ 13012 & 50006 \end{pmatrix} \begin{pmatrix} 5.0007 & 11.0008 \\ 14.0012 & 9.0010 \end{pmatrix}$$

with $14005 = -5 + 4 \cdot 10^4 + 10 \cdot (1 + 10^4)$ etc. and $5.0007 = -5 - 3 \cdot 10^{-4} + 10 \cdot (1 + 10^{-4})$ etc.

In this example, too, the above described method has been adjusted to an eight digit decimal arithmetic without rounding.

The multiplication of these two matrices of encoded elements and the successive addition exploiting the described method has the following resultant matrix of sums:

$$\begin{pmatrix} 1820401.0 & 2260364.0 \\ 1350295.0 & 1880340.0 \end{pmatrix}$$

This matrix has to be decoded as described:

$$\begin{pmatrix} 401 & 364 \\ 295 & 340 \end{pmatrix}$$

This matrix has to be corrected by subtracting the following matrix:

$$\begin{pmatrix} 380 & 380 \\ 340 & 340 \end{pmatrix}$$

which is the result of the following calculations:

$380 = 10 \cdot (10 \cdot 4 + 0 + (-2))$
$340 = 10 \cdot (10 \cdot 4 + (-4) + (-2))$
with $(-5) + 4 + 3 + (-2) = 0$
$2 + 3 + (-4) + (-5) = -4$
$(-5) + (-3) + 4 + 2 = -2$
and $1 + (-2) + (-1) + 0 = -2$ The result of this subtraction is as follows:

$$\begin{pmatrix} 21 & -16 \\ -45 & 0 \end{pmatrix}$$

This matrix is identical with the above matrix which was calculated in a known manner.

In this example the time saving effect of the invention is apparent as the encoded elements are used twice.

5.) Binary scalar product with four positive or negative integer values (second possibility):

Vectors: a = (−011, −111), b = (101, −010)

Encoded elements: $u1 = a1 + a2 \cdot 2^k$
$u2 = b1 + b2 \cdot 2^{-k}$

The precision of the magnitude of the elements of said vectors is three bits. Therefore k=7 would be sufficient for non-negative elements. Selecting k=8 provides a sign bit additionally.

Encoded elements:  $u1 = -011 - 111 \cdot 2^8$
$\phantom{Encoded elements:  u1} = -11100000011$ $u2 = 101 - 010 \cdot 2^{-8}$
$\phantom{u2} = 100.1111111$ Partial product: $p2 = -11100000011 \cdot 100,1111111$
$\phantom{Partial product:  p2} = -10001100000000,1111101$ As there is only one partial product (p2) the sum (s) is identical with said partial product (p2).

The sign bit of the right part, i.e. the first bit right of the decimal point, which is one, is added to the middle part with the following result:

$-10001100000001.1111101$

The middle part can now be extracted by ANDing with a mask:

```
        -10001100000001.1111101
AND      00000011111111.0000000
         00000001
```

The highest bit of this part is off, therefore decrementing is not needed.

The sign of this result is set negative as the signs are not equal.

The resultant scalar product is therefore $SP = -1$

In this example the time saving effect of the invention does not appear as the encoded elements are used only once.

6.) Two decimal matrices incorporating four scalar products with mixed positive and negative integer elements (second possibility):

The calculation of the matrices in a known manner has the following result:

$$\begin{pmatrix} -5 & 4 & 3 & -2 \\ 2 & 3 & -4 & -5 \end{pmatrix} \cdot \begin{pmatrix} -5 & 1 \\ -3 & -2 \\ 4 & -1 \\ 2 & 0 \end{pmatrix} = \begin{pmatrix} 21 & -16 \\ -45 & 0 \end{pmatrix}$$

The calculation according to the described method provides two matrices of encoded elements:

$$\begin{pmatrix} 39995 & -19997 \\ 30002 & -50004 \end{pmatrix} \quad \begin{pmatrix} -5.0003 & 0.9998 \\ 4.0002 & -1.0000 \end{pmatrix}$$

with $39995 = -5 + 4 \cdot 10^4$ etc. and $-5.0003 = -5 - 3 \cdot 10^{-4}$ etc.

In this example, too, the above described method has been adjusted to an eight digit decimal arithmetic without rounding.

The multiplication of these two matrices of encoded elements and the successive addition exploiting the described method has the following resultant matrix of Sums:

$$\begin{pmatrix} -279978.98 & 59984.001 \\ -350045.00 & 79999.999 \end{pmatrix}$$

These four sums are decoded according to the second possibility described with the following steps.

Extraction of the signs:

$$\begin{pmatrix} -1 & 1 \\ -1 & 1 \end{pmatrix}$$

Addition of the sign bit of the right term into the middle term, i.e. rounding of the fractional part:

$$\begin{pmatrix} 279979.98 & 59984.001 \\ 350045.00 & 80000.999 \end{pmatrix}$$

Eliminating the left term and the right term:

$$\begin{pmatrix} 9979 & 9984 \\ 45 & 0 \end{pmatrix}$$

The values with a most significant digit of 9 are complemented and their sign is altered. This is equivalent to a subtraction of 10000.

$$\begin{pmatrix} -21 & -16 \\ 45 & 0 \end{pmatrix}$$

As a last step, the sign is set negative if the extracted sign and the sign of the result obtained so far are not equal:

$$\begin{pmatrix} 21 & -16 \\ -45 & 0 \end{pmatrix}$$

This resultant matrix is identical with the matrix calculated in a known manner.

In this example, the time saving effect of the invention is apparent, too, as the encoded elements are used twice.

What is claimed is:

1. A method for reducing a number of steps performed by a digital processing machine in a procedure for processing images, the images stored in the form of data bits representing a matrix of pixels, the data bits identifiable as a plurality of vectors of said matrix, said method comprising the computer implemented steps of:
   (a) storing a first vector comprising at least four elements (a1, a2, a3, a4) which represent colors or gray levels of at least four respective pixels in said matrix;
   (b) storing a second vector comprising at least four elements (b1, b2, b3, b4) to be multiplied with said first vector (a1, a2, a3, a4);
   (c) encoding pairs or groups of the elements of said first vector to yield at least two encoded elements u1 and u3;
   (d) encoding pairs or groups of the elements of said second vector to yield at least two encoded elements u2 and u4;

(e) calculating at least two partial products p2, p4 such that $$p2 = u1 \times u2$$

$$p4 = u3 \times u4;$$

(f) adding up the partial products to form a stored sum;

(g) combining said stored sum with a bit mask whose width is determined by a capacity of said digital processing machine to strip off highest and lowest irrelevant bits from the stored sum;

(h) storing remaining bits of said stored sum as a scalar product;

(i) generating a new image in the form of stored data bits representing a second matrix of pixels derived from said scalar product; and (j) displaying said new image comprising said second matrix of pixels whose color or gray level is determined by the magnitude of said scalar product.

2. A method according to claim 1, wherein said encoded elements are defined by $$u1 = a1 + a2 \times 2^k$$

$$u2 = b1 + b2 \times 2^{-k}$$

$$u3 = a3 + a4 \times 2^k$$

$$u4 = b3 + b4 \times 2^{-k};$$

with the value of the exponent k being selected in such a manner that the value of $2^k$ is greater than the greatest possible value of said scalar product (SP).

3. A method according to claim 1, wherein for non-negative or non-positive values of said elements said step of combining said sum comprises the use of the equation:

$$(a1+a2 \cdot 2^k) \cdot (b1+b2 \cdot 2^{-k}) = a2 \cdot b1 \cdot 2^k + (a1 \cdot b1 + a2 \cdot b2) + a1 \cdot b2 \cdot 2^{-k},$$

with the value of the exponent (k) being selected in such a manner that the value of $2^k$ is greater than the greatest possible value of said scalar product (SP).

4. A method according to claim 3 wherein for negative and positive values of said elements said step of combining said sum comprises the use of $$(\alpha+a1) \cdot (\beta+b1) + (\alpha+a2) \cdot (\beta+b2) + \ldots + (\alpha+an) \cdot (\beta+bn) = (a1 \cdot b1 + a2 \cdot b2 + \ldots + an \cdot bn) + \alpha \cdot \Sigma(b) + \beta \cdot \Sigma(a) + n \cdot \alpha \cdot \beta$$

with the values of . and b being greater than or equal to the greatest magnitude of a negative element of said vectors, n being the number of elements of one vector, $$\Sigma(a) = a1 + a2 + \ldots + an \text{ and}$$

$$\Sigma(b) = b1 + b2 + \ldots + bn.$$

5. A method according to claim 3, wherein for negative and positive values of said elements said step of combining said sum further comprises the following steps:

adding the sign bit of the right term of the right side of said equation to the middle term, removing the left and the right term of the right side of said equation, and decrementing the middle term of said equation by $2^k$ if the sign bit of the middle term of the right side of said equation is on.

6. A method according to claim 1 wherein for storing said scalar product of two vectors having a plurality of elements said steps (a)–(i) are carried out for segments of said plurality of elements, thereby creating partial scalar products for said segments, respectively, and wherein said method comprises the further step of combining said partial scalar products of said segments for storing said scalar product (SP).

7. A method according to claim 2 wherein for storing said scalar product of two vectors having a plurality of elements said steps (a)–(i) are carried out for segments of said plurality of elements, thereby creating partial scalar products for said segments, respectively, and wherein said method comprises the further step of combining said partial scalar products of said segments for storing said scalar product (SP).

8. A method according to claim 3 wherein for storing said scalar product of two vectors having a plurality of elements said steps (a)–(i) are carried out for segments of said plurality of elements, thereby creating partial scalar products for said segments, respectively, and wherein said method comprises the further step of combining said partial scalar products of said segments for storing said scalar product (SP).

9. A method according to claim 4 wherein for storing said scalar product of two vectors having a plurality of elements said steps (a)–(i) are carried out for segments of said plurality of elements, thereby creating partial scalar products for said segments, respectively, and wherein said method comprises the further step of combining said partial scalar products of said segments for storing said scalar product (SP).

10. A method according to claim 5 wherein for storing said scalar product of two vectors having a plurality of elements said steps (a)–(i) are carried out for segments of said plurality of elements, thereby creating partial scalar products for said segments, respectively, and wherein said method comprises the further step of combining said partial scalar products of said segments for storing said scalar product (SP).

11. A computer tomographic method for reducing a number of steps performed in a procedure for processing images, the images stored in the form of data bits representing a matrix of pixels, the data bits identifiable as a plurality of vectors of said matrix, said method comprising the computer implemented steps of:

(a) storing a first vector comprising at least four elements (a1, a2, a3, a4) which represent colors or gray levels of at least four respective pixels in said matrix;

(b) storing a second vector comprising at least four elements (b1, b2, b3, b4) to be multiplied with said first vector (a1, a2, a3, a4);

(c) encoding pairs or groups of the elements of said first vector to yield at least two encoded elements u1 and u3;

(d) encoding pairs or groups of the elements of said second vector to yield at least two encoded elements u2 and u4;

(e) calculating at least two partial products p2, p4 such that $$p2 = u1 \times u2$$

$$p4 = u3 \times u4;$$

(f) adding up the partial products to form a stored sum;

(g) combining said stored sum with a bit mask whose width is determined by a capacity of said digital processing machine to strip off highest and lowest irrelevant bits from the stored sum;

(h) storing remaining bits of said stored sum as a scalar product;

(i) generating a new image in the form of stored data bits representing a second matrix of pixels derived from said scalar product; and (j) displaying said new image comprising said second matrix of pixels whose color or gray level is determined by the magnitude of said scalar product.

12. The method according to claim 11, wherein the encoding steps are eliminated if a newly stored vector comprises elements the same as in a vector whose elements were previously encoded.

13. The method according to claim 1, wherein said images include computer tomography images.

14. The method according to claim 1, wherein the encoding steps are eliminated if a newly stored vector comprises elements the same as in a vector whose elements were previously encoded.

* * * * *